Feb. 9, 1943.  J. E. BANCROFT  2,310,273
PROJECTOR
Filed June 18, 1941  2 Sheets-Sheet 1
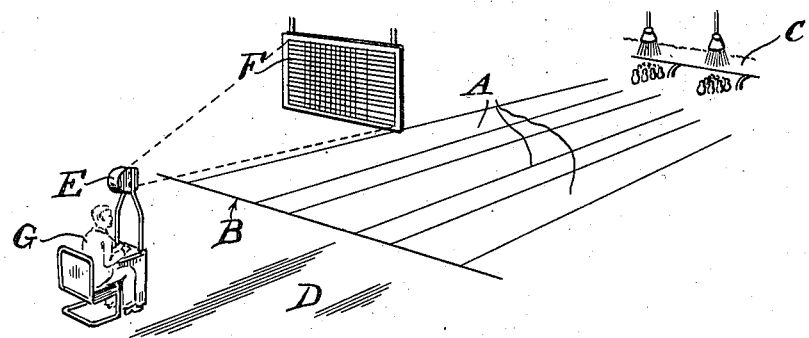
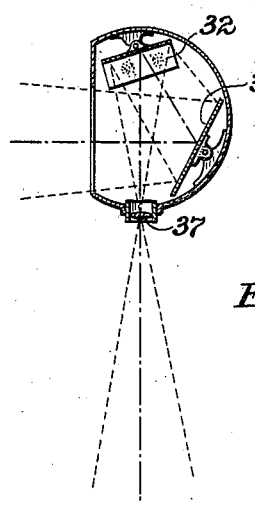
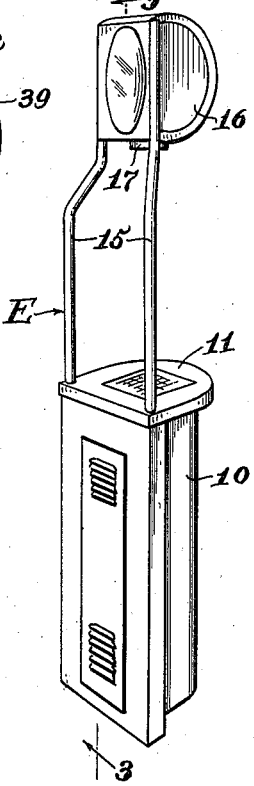
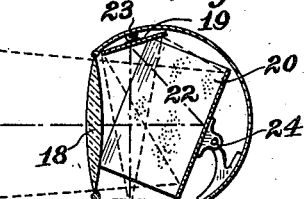
INVENTOR.
James E. Bancroft.
BY
Gluck & Breitenfeld
HIS ATTORNEYS Feb. 9, 1943.   J. E. BANCROFT   2,310,273
PROJECTOR
Filed June 18, 1941   2 Sheets-Sheet 2

INVENTOR.
James E. Bancroft.
BY
HIS ATTORNEYS

Patented Feb. 9, 1943

2,310,273

UNITED STATES PATENT OFFICE 2,310,273

PROJECTOR

James E. Bancroft, Jamaica, N. Y., assignor to American Bowling and Billiard Corporation, New York, N. Y., a corporation of New York Application June 18, 1941, Serial No. 398,517

7 Claims. (Cl. 88—24)

This invention relates generally to projectors and more particularly to projectors in which a true image, that is an image that is erect and unreverted, of an object situated in front of an observer is formed on a screen situated in the field of vision of said observer, so that he can see both the object and its image without shifting his position and merely by shifting his gaze.

This application is a continuation in part of my application Serial No. 290,426 which has eventuated into Patent No. 2,250,174 dated July 22, 1941.

For purposes of convenience of disclosure I have disclosed in the drawings, and will describe in the specification, my invention embodied in an arrangement particularly intended for employment in projecting scores in games such as bowling, and will, throughout the appended specification refer to my invention in connection with the illustrated embodiment by reference to terminology and practice which are peculiar to that game. It will be understood, however, that my invention is not to be limited by such illustrations or language or disclosures, except where, and to the extent called for by the express language of the claims.

In the conventional bowling alley a scorer sits at the approach end of the alley facing in the direction of the pin end and records the scores on a pad that is in front of him. Players and onlookers keep themselves informed of the progress of the game by looking at this score pad, and this becomes difficult when the crowd is large, and only relatively few onlookers can come close enough to the score pad to see it.

One of the objects of my invention is an arrangement whereby the recordings of the scorekeeper, as for example, on a score frame that is horizontally positioned, can be projected as an unchanged image on a larger scale in the line of vision of a spectator. In its particular application to the game of bowling, the arrangement disclosed is such that the score keeper who records the score, as well as the spectators who desire to see the record, can have presented in their line of vision as they view the play or its recordation, an unchanged image on a larger scale.

This general object I attain by an arrangement whereby inversions laterally and vertically of the image forming rays from the score record are compensated for and balanced out, so that there is presented, in the line of vision of any observer, an uninverted and unreverted image, so that the observer can get a true picture of the score record as it is being recorded, and so that the scorekeeper, who makes the recordations, can check the accuracy of the recordations merely by watching the image of the recordation.

In the illustrative embodiment of my invention, I show the attainment of this object by the employment in the optical system of a pair of mirrors symmetrically positioned in reference to the projected rays, and each of which will give a conventional reflection, and which jointly give the result that each balances out of the other the reversal which a conventional mirror gives.

In accordance with the accomplishment of my general objectives by this arrangement, I employ mirrors of the true 90° angle type, that is mirrors having the planes of their reflecting surfaces meeting at an angle of 90°, and, further, having the line along which they meet symmetrically positioned with reference to the image forming rays.

A further object of my invention is an arrangement of mirrors so positioned with reference to the optical axis of the system that the arrangement is more compact and therefore easier to set up, handle and transport. I attain this object by employment of a plane mirror and a mirror of the true 90° angle type so arranged that the rays from the object are received first by the plane mirror and reflected thereby on to the 90° angle mirror, from which they finish their traverse through the optical system to the point where they are projected on the screen.

These objects, and such other objects as will hereinafter appear or be pointed out, are attained in the illustrative embodiments of my invention shown in the drawings, in which:

Figure 1 is a perspective view of a bowling alley installation with my improved projector in use therein;

Figure 2 is a perspective view of one illustrative embodiment of my invention;

Figure 3 is a vertical medial section of the projector of Figure 2, taken substantially in the plane indicated by the line 3—3 of Figure 2, looking in the direction of the arrows; and Figures 4 and 5 are respectively an elevational view and a plan view of the roof mirror constituting one element of my invention;

Figure 7 is a fragmentary sectional view, similar to the upper portion of Figure 3, of a portion of a second embodiment of my invention.

Figure 6:
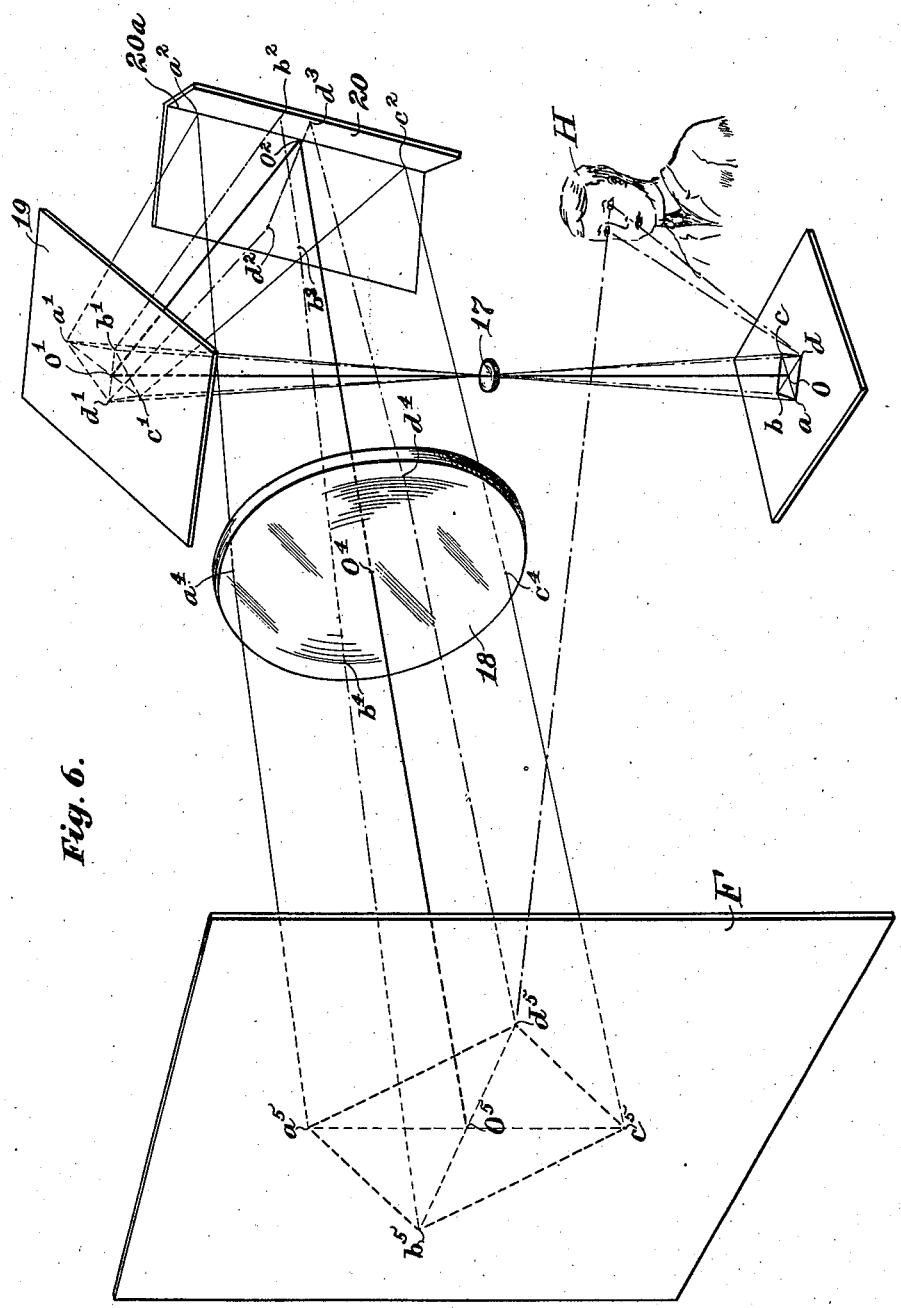
Figure 6 is a diagrammatic view illustrative of the optical principles of my invention.

Referring now to the drawings in detail, I have shown at A the alley beds of a bowling installation, at B the foul line, at C the pit end of the alley, at D the space within which the players stand, at E my improved projector and at F a screen on which the projector throws the image of the score which the scorekeeper G keeps on a score frame provided for that purpose on the projector E.

The details of the projector E will now be explained with the aid of Figures 2, 3, 4 and 5.

The projector E comprises in general a lower housing or casing 10 in front of which the scorekeeper is positioned. The top of the casing is in the form of a platform 11 and serves as a writing table or platform for the scorekeeper. The platform 11 is provided with a transparent or translucent plate 12 on which may be placed a piece of transparent or tranlucent material, to which a score frame is applied, as by imprinting it thereon. If desired, of course, the score frame may be applied directly to the plate 12.

Within the casing 10 is a source of illumination 13, such as an incandescent bulb suitable for projection work, and a condenser system 14 is also contained in the casing 10 and serves to transmit and concentrate light from the source 13 on the plate 12, so as to illuminate the said plate and also the score frame positioned thereon or applied thereto. Ventilating openings 14a and 14b are also shown on the casing 10 for the obvious purpose of preventing overheating of the casing.

Supported above the housing 10, as on arms 15, which may be adjustably held in the casing 10 as indicated at 15a, is a second housing 16, which comprises a combined projecting lens and redirecting system adapted to pick up rays from the object on or above the plate 12 and to transmit it to the screen F. It will be observed that the lens system is shown as comprising two components 17 and 18, each being represented for the sake of simplicity as a simple lens, although obviously each may comprise a system of lenses, the first having its axis positioned substantially vertically and acting to receive the light from the score frame or the plate 12, while the second lens component 15 receives the light from the lens component 17 after it has had its direction changed and transmits it to the screen F. The axis of the lens component 18 is made substantially horizontal for that purpose, or as nearly horizontal as is required in order to effect transmission in the desired direction.

In order to effect this redirection a system of reflectors is provided. This system is shown as comprising the plane reflector 19 positioned above the lens component 17 and a second reflector 20 which is of the type known as a 90° roof mirror and which is shown more in detail in Figures 4 and 5. As can be seen from these figures the roof mirror 20 comprises a pair of plane reflectors or mirrors 21 and 22 placed at 90° to each other and meeting along the line or axis 20a and having their reflecting surfaces facing each other.

As shown in Figure 3 the reflector 19 and the roof mirror 20 are both pivotally mounted, this being indicated respectively at 23 and 24, and thereby adjustment is provided for by which the direction of the light may be controlled. If desired, further, although this is not shown in the drawings, the entire casing 16 may also be pivotally mounted on the arms 15.

As already stated, while for purposes of simplicity the elements 17 and 18 and the lens system have been shown as simple lenses it will be understood that each in turn may comprise a system of lenses. However, it is one of the characteristic advantages of my system that relatively simple and inexpensive lenses may be used to obtain effects equalling if not excelling those obtained in other systems with much more expensive lenses.

The lens 17 may be adjustably mounted in the casing 14 to afford opportunity for fine focusing where the adjustment already described as provided at 15a is insufficient for that purpose.

The lens 18 in addition to its projecting function also serves as a window whereby foreign matter is excluded from the casing 16.

It will be observed that the arrangement of the optical parts contained in the casing 16 is compact and effective and the use of the two elements 17 and 18 in the lens system enables the use of a longer focus element 17, whereby the said element and consequently the housing 16 may be supported at a convenient height above the operator and the plate 12.

Referring now to Figure 6, the optical principles of my invention will be made clear. Before going into the details of these principles, it may be observed that the effect of the optical system comprising the two lens systems 17 and 18 and the reflectors 19 and 20 is to produce an erect, unreverted image of the object on the screen when the object and its image are positionally related as indicated in Figure 6 and in Figure 1.

This is accomplished by an inversion and a simultaneous reversion in the lens system, and, more specifically, in the lens system 17, which is corrected in the mirror system 19 and 20 so as to secure an erection of the image 20, accompanied by a reversion from left to right in the roof mirror 20, so that left to right in the object again becomes left to right in its image on the screen.

The paths of representative rays will now be traced in detail.

As an object there has been shown a diamond shaped figure $a$—$b$—$c$—$d$ situated in front of the observer H. This object is positioned in a substantially horizontal plane, with the point $a$ farthest from the observer and the point $c$ nearest the observer, and the intersection of the lines drawn between the points $a$, $c$ and $b$, $d$ respectively being designated by 0, which point has been shown positioned in the axis of the lens 17. This axial ray will strike the under side of the reflector 20 at a point $0^1$, from which it is reflected to the axis $20a$ of the roof mirror 20, which it strikes at the point $0^2$, from which in turn it is reflected along the axis of the lens 18, which it pierces centrally at the point $0^4$ and continues until it strikes the screen F at the point $0^5$.

The principal ray from the point $a$ of the object, that is the ray which passes through the center of the lens 17, strikes the under side of the reflector 19 at a point $a^1$ and reaches the axis of the roof mirror 20 a point $a^2$, from which it passes through the lens 18 at point $a^4$ and reaches the screen F at the point $a^5$. It will be observed that whereas the point $a$ in the object is farthest from the observer its image $a^5$ will now appear at the top of the screen above the point $0^5$, which is the desired relation.

The point $c$ nearest the observer in the object similarly results in an image at the point $c^5$, which can easily be understood by tracing the principal ray from the point $c$ through the center of the lens 17 and through the the successive points $c^1$, $c^2$, $c^4$ to the image point $c^5$.

The object point $d$ located to the left of the point 0 results in an image at point $d^5$, also to the left of the point $0^5$. Tracing the principal ray from this point $d$ which passes through the center of the lens 17, it will be observed that it strikes the mirror 19 at a point $d^1$, which is located to the right of the point $0^1$ as viewed by the observer. It is reflected by the mirror 19 to a point $d^2$ also on the right half of the roof mirror 20 and from the right half of the roof mirror 20 it is reflected to a point $d^3$ on the left half of the roof mirror at which point it is directed through a point $d^4$ in the lens to the point $d^5$.

It will be observed that the left to right reversion occurring in the lens 17 has been corrected in the roof mirror.

The principal ray from the object point $b$ to the right of the point 0, which passes through the center of the lens 17, can be similarly traced through the point $b^1$ on the reflector 19, the points $b^2$ and $b^3$ in the roof mirror 20, and $b^4$ in the lens 18, until it reaches the point $b^5$ which is positioned on the screen to the right of the point $0^5$, as seen by the observer.

In the embodiment of my invention shown in Figure 7, it will be observed that the positions of the plane mirror 39 and the roof mirror 32, are inverse to their positions in Figure 3. This construction has the disadvantage that it requires more vertical space in proportion to the vertical dimension of the field of light rays emitted by the projector, as a comparison of Figures 3 and 7 will make clear, which is of great importance in an installation such as that of Figure 1, where the minimum obstruction in a vertical direction is desirable. As regards obstruction in a transverse horizontal direction the systems of Figures 3 and 7 are on a par. As to obstruction in a horizontal direction longitudinally of the alley bed, the system of Figure 7 has the advantage, but this is of no consequence in an installation such as that of Figure 1, in which it is desired to keep the spectators' view clear.

A further difference between the systems of Figures 3 and 7 is that in the latter only a single lens system 37 is used and the opening 34 in the casing 36 may be left open, or if it is desired to close it a plane glass or the like may be used.

Having thus described my invention and illustrated its use, what I claim as new and desire to secure by Letters Patent, is:

1. An optical projecting system for producing a true erect image on a screen of an object positioned in a plane at an angle to the screen, comprising a screen in front of an observer, an object support in front of said observed, a first lens component adapted to receive rays from an object on said support, a plane mirror adapted to receive the image forming rays from said first lens component, a 90° roof mirror positioned symmetrically to the axis of the system adapted to receive the image forming rays from said plane mirror, and a second lens component positioned with its axis at an angle to the axis of the said first lens so as to receive the image forming rays from said roof mirror and to cause them to converge on said screen so as to form an image thereon.

2. A projector comprising a first casing, having a transparent top for the support of an object, means in said casing for illuminating said object, a second casing, a mounting for said second casing, whereby it is positioned above said first casing and is adjustable in a vertical direction relatively to said first casing and also pivotally, a projecting lens system for producing a single real image comprising a pair of components mounted in said second casing, one component being mounted in the bottom of said second casing and adapted to receive rays from said object, and the other component being mounted in the side of said casing and adapted to transmit rays directly to a screen, and a reflecting system in said second casing for transmitting light rays from one lens component to the other, said reflecting system including a pivotally mounted plane reflector and a pivotally mounted 90° roof mirror symmetrically positioned relatively to the optical axis of the projector.

3. A projector comprising a first casing, having a transparent top for the support of an object, means in said casing for illuminating said object, a second casing, a mounting for supporting said second casing above said first casing, a projecting lens system for producing a single real image comprising a pair of components mounted in said second casing, one component being mounted in the bottom of said second casing and adapted to receive rays from said object and the other component being mounted in the side of said casing and adapted to transmit rays to a screen, and a reflecting system in said second casing for transmitting light rays from one lens component to the other and including a pivotally mounted plane reflector and a pivotally mounted 90° roof mirror symmetrically positioned relatively to the optical axis of the projector.

4. An optical system for projecting the image of an illuminated object in front of an observer on an opaque screen also in front of the observer, said system consisting of a projecting lens system for forming a single real image and reflecting means, said reflecting means consisting of a plane reflector and a reflecting unit constituted by a pair of plane reflectors positioned with their planes at right angles to each other, and a mounting for said lens system said plane reflector and said reflecting unit for positioning them relatively to each other to the object and to the screen, so that the light from the object successively passes from the plane reflector to the reflector unit in its passage from the object to the screen, whereby each ray of light undergoes only three reflections and at least one refraction, and whereby an erect and unreverted image of the object is thrown on the screen.

5. An optical projecting system for producing a true erect image of a bowling score card positioned in a horizontal plane on a screen positioned in a plane at an angle to the score card and spaced therefrom in the direction of the pin setting end of the bowling alley, whereby the scorekeeper and the players will have the image on the screen in the field of vision when viewing the pin end of the alley, said optical system comprising a screen adapted to be positioned in front of the score card table, a first lens component positioned to receive upwardly directed rays from the score card, a plane mirror adapted to receive the image forming rays from said first lens component, a 90° roof mirror positioned symmetrically to the axis of the system and positioned to receive the image forming rays from said plane mirror and to transmit them forwardly of the alley and in the direction of the screen, and a second lens component positioned with its axis at an angle to the axis of the said first lens so as to receive the image forming rays from said roof mirror and cause them to converge on said screen so as to form an image thereon.

6. An optical projecting system for producing a true erect image of a bowling score card positioned in a horizontal plane on a screen positioned in a plane at an angle to the score card and spaced therefrom in the direction of the pin setting end of the bowling alley, whereby the score keeper and the players will have the image on the screen in the field of vision when viewing the pin end of the alley, said optical system comprising a first casing, having a transparent top for the support of an object, means in said casing for illuminating said object, a second casing, a mounting for supporting said second casing above said first casing, a projecting lens system for producing a single real image comprising a pair of components mounted in said second casing, one component being mounted in the bottom of said second casing and adapted to receive rays from said object and the other component being mounted in the side of said casing and adapted to transmit rays to a screen, and a reflecting system in said second casing for transmitting light rays from one lens component to the other and including a plane reflector and a 90° roof mirror symmetrically positioned relatively to the optical axis of the projector.

7. An optical projecting system for producing a true erect image of a bowling score card positioned in a horizontal plane on a screen positioned in a plane at an angle to the score card and spaced therefrom in the direction of the pin setting end of the bowling alley, whereby the scorekeeper and the players will have the image on the screen in the field of vision when viewing the pin end of the alley, said optical system comprising a double inverting and reverting system, consisting of a lens system for forming a single real image comprising a pair of lens components and a system of reflectors positioned intermediate said lens components, the first of said lens components inverting and reverting the rays from the score card, said reflector system causing a second inversion and reversion of said rays, and said second lens component serving to bring said rays to focus on a screen positioned in the direction of the pin setting end of the bowling alley, without further inversion and reversion, whereby a true image of the score card will be in the line of vision of the scorekeeper and the players when viewing the game at said pin end.

JAMES E. BANCROFT.